United States Patent
Kim (10) Patent No.: US 10,506,360 B2
(45) Date of Patent: Dec. 10, 2019

(54) SYSTEM FOR CORRECTING SOUND SPACE INSIDE VEHICLE

(71) Applicant: SQAND CO. LTD., Yuseong-gu, Daejeon (KR)

(72) Inventor: Yang-Hann Kim, Daejeon (KR)

(73) Assignee: SQAND CO. LTD. (KR)

( * ) Notice: Subject to any disclaimer, the term of this patent is extended or adjusted under 35 U.S.C. 154(b) by 0 days.

(21) Appl. No.: 16/097,302

(22) PCT Filed: Apr. 25, 2017

(86) PCT No.: PCT/KR2017/004342
§ 371 (c)(1),
(2) Date: Nov. 1, 2018

(87) PCT Pub. No.: WO2017/188685
PCT Pub. Date: Nov. 2, 2017

(65) Prior Publication Data
US 2019/0141465 A1     May 9, 2019

(30) Foreign Application Priority Data
Apr. 29, 2016 (KR) .................. 10-2016-0052968

(51) Int. Cl.
*H04R 3/00* (2006.01)
*H04S 7/00* (2006.01)
(Continued)

(52) U.S. Cl.
CPC .............. *H04S 7/303* (2013.01); *B60R 11/02* (2013.01); *H04R 1/40* (2013.01); *H04R 3/00* (2013.01);
(Continued)

(58) Field of Classification Search
CPC . H04R 5/00; H04R 3/02; H04R 29/00; H04R 3/005; H04R 2201/403;
(Continued)

(56) References Cited

U.S. PATENT DOCUMENTS 5,802,190 A    9/1998  Ferren
8,369,536 B2   2/2013  Kim et al.
(Continued)

FOREIGN PATENT DOCUMENTS

JP    2007-329821    12/2007
KR    10-2004-0032393    4/2004
(Continued)

OTHER PUBLICATIONS

International search report for corresonding Application No. PCT/KR2017/004342 dated Jun. 30, 2017. WO.

*Primary Examiner* — Vivian C Chin
*Assistant Examiner* — Ubachukwu A Odunukwe
(74) *Attorney, Agent, or Firm* — The Belles Group, P.C.

(57) ABSTRACT

An acoustic spatial adjustment system may be provided that includes: a wireless communication module which receives a voice signal from a mobile terminal connected thereto by wireless communication; an adjustment controller which filters the voice signal in order to generate a sound source signal for focusing an output of the voice signal transmitted from the wireless communication module on a bright zone (BZ); an amplifier which divides the sound source signal transmitted from the adjustment controller into multi-channels and amplifies; and a plurality of speakers which output the sound source signal transmitted from the amplifier. As a result, the sound can be focused on a specific zone in the vehicle by using existing mounted speakers in the vehicle or by installing only additional speakers for performance improvement. Also, the individually distinguished sound (Continued)

(audio signal of a stereo system, CD, DVD, etc., a telephone voice signal connected by Bluetooth, etc.) can be adjusted to be heard only in a specific zone (bright zone) and can be adjusted to be heard very small or not to be heard in a zone (dark zone) other than the specific zone. Also, the user is able to select or adjust the sound focusing in the vehicle.

7 Claims, 5 Drawing Sheets

(51) Int. Cl.
  *B60R 11/02*    (2006.01)
  *H04R 1/40*    (2006.01)
  *H04R 5/02*    (2006.01)
  *H04R 5/04*    (2006.01)
  *H04R 3/04*    (2006.01)
  *H04S 3/00*    (2006.01)

(52) U.S. Cl.
  CPC ............... *H04R 3/04* (2013.01); *H04R 5/02* (2013.01); *H04R 5/04* (2013.01); *H04S 3/008* (2013.01); *H04R 2420/07* (2013.01); *H04S 2400/01* (2013.01)

(58) Field of Classification Search
  CPC ....... H04R 2499/13; H04S 7/303; H04S 7/30; H04S 7/302; B60R 11/02
  USPC ........ 381/17, 57, 86, 71.4, 302, 56, 63, 103, 381/71, 71.1
  See application file for complete search history.

(56) References Cited

U.S. PATENT DOCUMENTS

| | | | |
|---|---|---|---|
| 9,326,061 B2 | 4/2016 | Kim et al. | |
| 9,609,427 B2 | 3/2017 | Jeong et al. | |
| 2004/0240676 A1* | 12/2004 | Hashimoto | H04R 5/02 381/56 |
| 2006/0262935 A1* | 11/2006 | Goose | H04S 3/002 381/17 |
| 2009/0022330 A1* | 1/2009 | Haulick | H04M 9/082 381/57 |

FOREIGN PATENT DOCUMENTS

| | | |
|---|---|---|
| KR | 10-2009-0082978 | 8/2009 |
| KR | 10-20080125309 | 6/2010 |
| KR | 10-2013-0137903 | 12/2013 |
| KR | 10-2014-0051473 | 5/2014 |

* cited by examiner

SYSTEM FOR CORRECTING SOUND SPACE INSIDE VEHICLE

CROSS-REFERENCE TO RELATED PATENT APPLICATIONS

The present application is a U.S. national stage application under 35 U.S.C. § 371 of PCT Application No. PCT/KR2017/004342, filed Apr. 25, 2017, which claims priority to Korean Patent Application No. 10-2016-0052968, filed Apr. 29, 2016. The disclosures of the aforementioned priority applications are incorporated herein by reference in their entireties.

TECHNICAL FIELD

The present disclosure relates to an acoustic spatial adjustment system in a vehicle and more particularly to an acoustic spatial adjustment system capable of causing sound output from a speaker provided in a vehicle to be focused on a desired location.

BACKGROUND ART

With the development of an AV system provided in a vehicle, more and more attention is paid to the sound in the vehicle. For example, the sound of a portable device such as a mobile terminal, a PMP, an MP3 player, etc., is output from a speaker through a wireless and wired connection means such as Bluetooth, AUX, etc. In particular, active research is being conducted to control the sound output from the speaker in the vehicle in accordance with a location in the vehicle (a rider's position).

A sound control technology includes, for example, a sound field reproduction method, an active noise control method which decreases a sound volume of a space by using a plurality of active sound sources, a method for changing an interval between the sound sources arranged in a specific shape, and a method for increasing a sound power which is radiated at a specific angle by changing a time delay between the sound sources and the magnitude of the sound input.

However, it is difficult to apply a mathematical solution for a specific sound source array to any sound source. For this reason, optimization research has been conducted to obtain a maximum directionality in a particular direction through the assumption of any sound source array. However, this research has assumed only any sound source array and is not suitable to be applied to a common listening space having radiation forms of various sound sources, sound reflection, and sound absorption.

Furthermore, U.S. Pat. No. 5,802,190 (Title of the invention: Linear speaker array) discloses a technology for controlling indirect characteristics such as directionality by using a limited assumption which ignores the distance to the listener or reflection, etc. U.S. Pat. No. 5,910,990 (Title of the invention: Apparatus and method for automatic equalization of personal multi-channel audio system) discloses a method for reproducing a signal without distortion by using transfer function.

Also, Korean Patent Application No. 10-2008-0125309 (Title of the invention: Directional sound generating apparatus and method) proposes a method for radiating a sound to a specific zone. However, it includes content that the sound is focused on the specific zone by disposing high directional speakers, etc.

The above-mentioned documents have a problem in that it is difficult to control a zone on which the sound is intended to be focused in the environment, for example, a vehicle, where the locations of the speakers are fixed. That is, a hardware-based change is necessarily required because the sound cannot be focused on the specific zone by using existing mounted speakers.

As such, the conventional method for controlling the sound in a space by using a plurality of the sound sources simply changes the time delay between the sound sources and the magnitude of the sound input, and only changes the directionality of the sound source by using a restricted type of the sound source array, without considering a rider's position in the vehicle.

In particular, in a condition where a driver makes a call frequently through Bluetooth while driving, other riders in the vehicle do not need to hear the call contents, so that it is necessary that the other calling party's voice output from the speaker should be focused on the driver. However, the above-mentioned method cannot change the location of the speaker in the vehicle and thus cannot be applied to existing vehicles.

Furthermore, when an alarm sound is output from a navigation apparatus during the playing of music through the AV system in the vehicle, there is a case where the music and the alarm sound from the navigation apparatus are simultaneously output from the same speaker. Here, there is a need to control the position where the output of the music is focused and the position where the alarm sound of the navigation apparatus is focused.

As such, there are high technical requirements for controlling the locations of a variety of sounds output in the vehicle.

DISCLOSURE

Technical Problem

The present invention is designed to solve the above-described problems. The object of the present invention is to provide an acoustic spatial adjustment system capable of focusing the sound in a vehicle on a specific zone.

The object of the present invention is to provide an acoustic spatial adjustment system capable of focusing the sound in the vehicle on a specific zone by using existing mounted speakers without changing the position of the speaker in the vehicle.

The object of the present invention is to provide an acoustic spatial adjustment system capable of focusing the sound in the vehicle on a specific zone by installing only additional speakers for performance improvement.

The object of the present invention is to provide an acoustic spatial adjustment system capable of controlling such that the individually separated sound (audio signal of a stereo system, CD, DVD, etc., a telephone voice signal connected by Bluetooth, etc.) is adjusted to be heard only in a specific zone (bright zone) and to be heard very small or not to be heard in a zone (dark zone) other than the specific zone.

The object of the present invention is to provide an acoustic spatial adjustment system which allows a user to select or control the focusing of the sound in the vehicle.

Technical Solution

One embodiment is an acoustic spatial adjustment system including a wireless communication module which receives a voice signal from a mobile terminal connected thereto by wireless communication; an adjustment controller which filters the voice signal in order to generate a sound source signal for focusing an output of the voice signal transmitted from the wireless communication module on a bright zone (BZ); an amplifier which divides the sound source signal transmitted from the adjustment controller into multi-channels and amplifies; and a plurality of speakers which output the sound source signal transmitted from the amplifier.

The adjustment controller may filter the voice signal by using a filter coefficient which maximizes a ratio between a spatially averaged acoustic energy of the bright zone (BZ) and a spatially averaged acoustic energy of a zone other than the bright zone (BZ).

The wireless communication may be Bluetooth or Near Field Communication (NFC).

The voice signal may have a frequency range of from 300 Hz to 4,000 Hz.

Another embodiment is an acoustic spatial adjustment system including: a media source provider which provides an audio signal; a user input unit which receives a user's input for location selection of a bright zone (BZ) on which an output of the audio signal provided from the media source provider is focused; a main controller which controls the output of the audio signal on the basis of at least one of the audio signal provided from the media source provider and the user's input transmitted from the user input unit; an adjustment controller which filters the audio signal in order to generate a sound source signal for focusing the audio signal on the bright zone (BZ) corresponding to the user's input; an amplifier which divides the audio signal received from the main controller or the sound source signal received from the adjustment controller into multi-channels and amplifies; and a plurality of speakers which output the sound source signal transmitted from the amplifier.

The adjustment controller may filter the audio signal by using a filter coefficient which maximizes a ratio between a spatially averaged acoustic energy of the bright zone (BZ) and a spatially averaged acoustic energy of a zone other than the bright zone (BZ).

The acoustic spatial adjustment system may further include a storage which stores a filter coefficient corresponding to a plurality of the bright zones. The adjustment controller may read the filter coefficient corresponding to the bright zone selected by the user from the storage and may filter the audio signal.

The user input unit may include a touch screen, a jog-shuttle, a switch, or a button.

The media source provider may include at least one of a wireless communication module, an AUX module, a USB module, a memory module, a DVD module, and a DMB module.

Advantageous Effects

According to the embodiment of the present invention, the acoustic spatial adjustment system according to the above-described configuration can focus the sound in the vehicle on a specific zone by using existing mounted speakers or by installing only additional speakers for performance improvement. Also, the acoustic spatial adjustment system can control such that the individually separated sound (audio signal of a stereo system, CD, DVD, etc., a telephone voice signal connected by Bluetooth, etc.) is adjusted to be heard only in a specific zone (bright zone) and to be heard very small or not to be heard in a zone (dark zone) other than the specific zone. Also, the acoustic spatial adjustment system can allow a user to select or control the focusing of the sound in the vehicle.

DESCRIPTION OF DRAWINGS

FIGS. 2a to 2c show an example in which the configuration for focusing zone setting of FIG. 1 is embodied in a vehicle;

MODE FOR INVENTION

Specific embodiments of the present invention will be described in detail with reference to the accompanying drawings. The specific embodiments shown in the accompanying drawings will be described in enough detail that those skilled in the art are able to embody the present invention. Other embodiments other than the specific embodiments are mutually different, but do not have to be mutually exclusive. Additionally, it should be understood that the following detailed description is not intended to be limited.

The detailed descriptions of the specific embodiments shown in the accompanying drawings are intended to be read in connection with the accompanying drawings, which are to be considered part of the entire written description. Any reference to direction or orientation is merely intended for convenience of description and is not intended in any way to limit the scope of the present invention.

Figure 1:
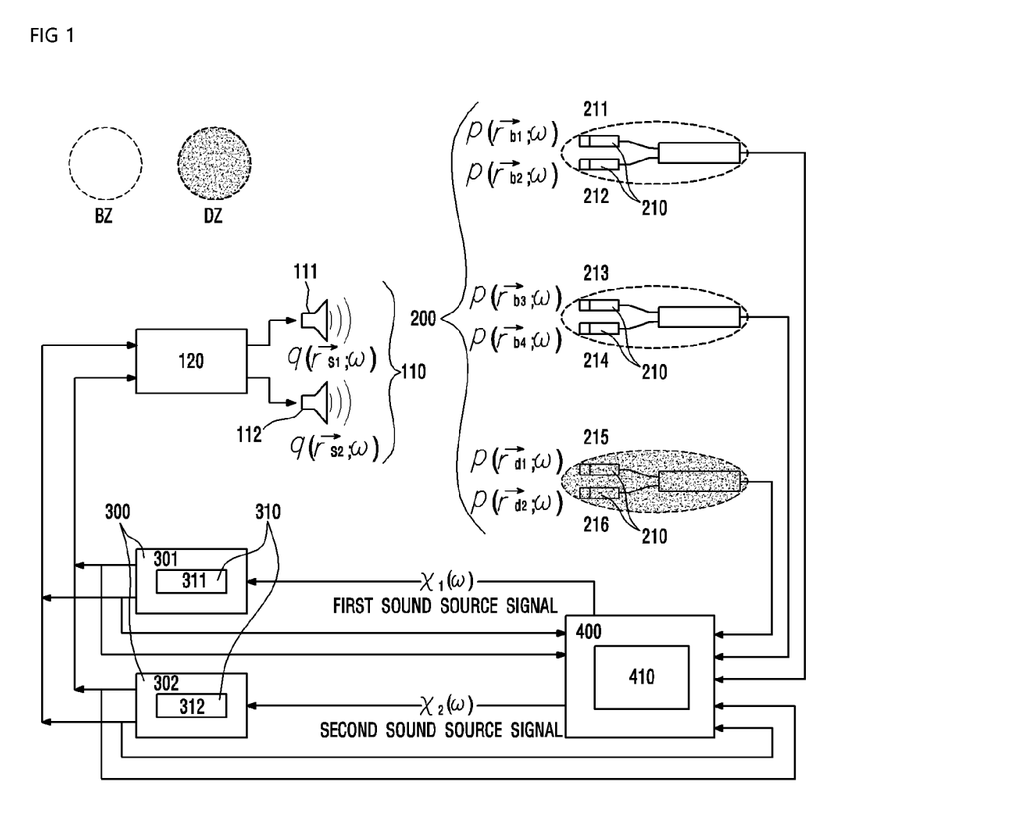
FIG. 1 is a view schematically showing a configuration for focusing zone setting.

FIG. 1 is a view schematically showing a configuration for focusing zone setting.

For convenience of description and understanding, FIG. 1 schematically shows a means for transfer function measurement, such as an acoustic space, a speaker 110, a microphone 210, etc. However, actually, as shown in FIGS. 2a to 2c, it is possible to measure the transfer function by using a greater number of the microphones 210 and speakers 110.

Figure 2B:
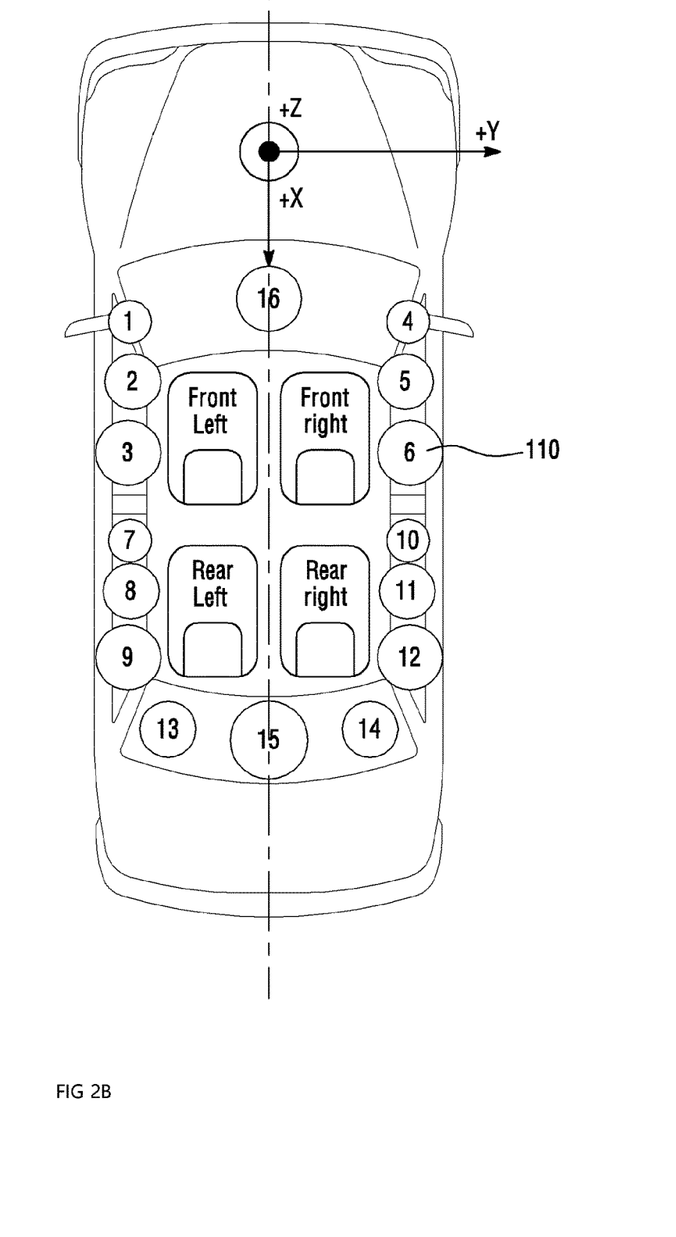
Figure 2C:
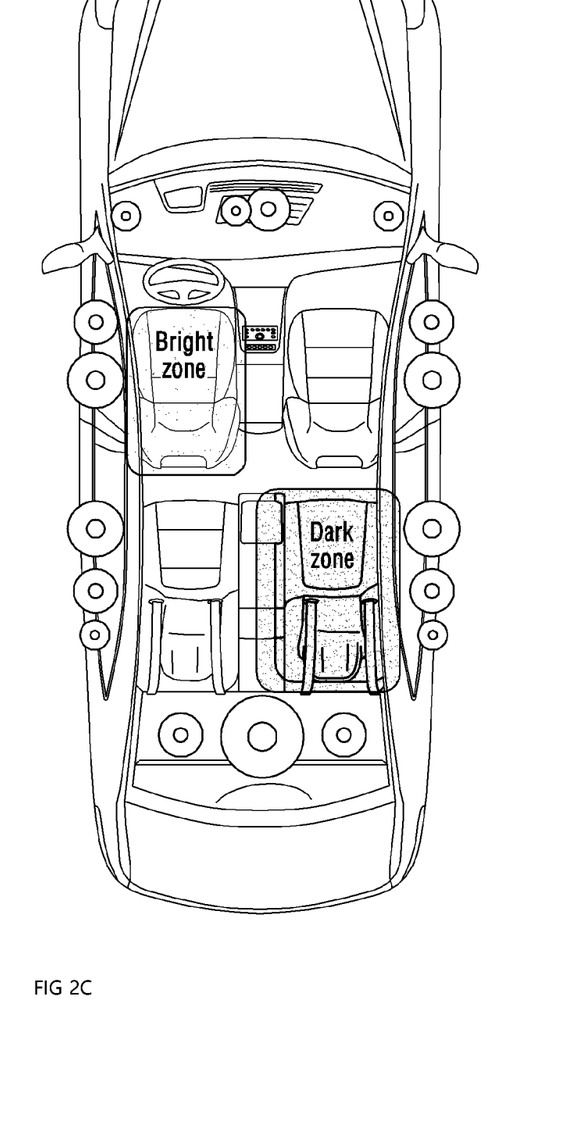

More specifically, as shown in FIGS. 2a to 2c, a focusing zone setting system may be composed of a plurality of the speakers having independent channels and the microphone having 30 channels which are spaced apart from each other by an interval of 4 cm and are arranged in the form of 6×5 array. The transfer function measurement may be performed in four seats (Front Left, Front Right, Rear Left, and Rear Right) in the vehicle. However, this is just an embodiment. The setting system can be implemented in various ways in accordance with the size, internal structure, configuration, etc., of the vehicle.

Referring back to FIG. 1, in the acoustic space (herein, the interior space of the vehicle), a first speaker and a second speaker, which function as a sound source, are installed in any location with the exception of a bright zone (hereinafter, referred to as BZ) and a dark zone (hereinafter, referred to as DZ).

Here, the bright zone (BZ) means a zone where a sound output from the first speaker and the second speaker is heard above a threshold value. The dark zone (DZ) means a zone where a sound output from the first speaker and the second speaker is heard below the threshold value. Simply, it can be thought that the bright zone (BZ) is a zone where a sound can be heard and the dark zone (DZ) is a zone where a sound cannot be heard. However, the distinction between the bright zone (BZ) and the dark zone (DZ) is based on a contrast between sound pressure levels, more particularly, a contrast between spatially averaged acoustic energies. Therefore, a small sound can be detected even in the dark zone (DZ).

In FIG. 1, the bright zone (BZ) and the dark zone (DZ) are schematized and distinguished by a dotted circle.

The sound pressure $p(\vec{r}_j|\vec{r}_{s,i};\omega)$ (a signal which is sensed by the microphone) at any point $\vec{r}_j$ generated by a first sound source and a second sound source can be represented by the following Equation 1.

$$p(\vec{r}_j|\vec{r}_{s,i};\omega) = \sum_{i=1}^{2} G(\vec{r}_j|\vec{r}_{s,i};\omega)q(\vec{r}_{s,i};\omega), \qquad \text{Equation (1)}$$

where $\vec{r}_j$ represents a j-th spatial point, and $\vec{r}_{s,i}$ represents a location of an i-th sound source. Additionally, $G(\vec{r}_j|\vec{r}_{s,i};\omega)$ is a transfer function representing a relation between $\vec{r}_j$ and $\vec{r}_{s,i}$. Here, the transfer function may be easily obtained by a definition of a mathematical model or an actual measurement. Equation (1) may be represented with respect to two points in the form of a matrix by the following Equation (2).

$$\begin{bmatrix} p(\vec{r}_1;\omega) \\ p(\vec{r}_2;\omega) \end{bmatrix} = \begin{bmatrix} G(\vec{r}_1|\vec{r}_{s1};\omega) & G(\vec{r}_1|\vec{r}_{s2};\omega) \\ G(\vec{r}_2|\vec{r}_{s1};\omega) & G(\vec{r}_2|\vec{r}_{s2};\omega) \end{bmatrix} \begin{bmatrix} q(\vec{r}_{s1};\omega) \\ q(\vec{r}_{s2};\omega) \end{bmatrix} \qquad \text{Equation (2)}$$

$$p = Gq$$

Likewise, a first bright zone (BZ1), a second bright zone (BZ2), the dark zone (DZ), and a total sound zone (TZ) including the two foregoing zones are represented in the form of a matrix by the following Equations (3) to (5). The subscripts b, d, and t in Equations (3) to (5) represent the bright zone (BZ), the dark zone (DZ), and the total sound zone (TZ) respectively.

$$\begin{bmatrix} p(\vec{r}_{b1};\omega) \\ p(\vec{r}_{b2};\omega) \\ p(\vec{r}_{b3};\omega) \\ p(\vec{r}_{b4};\omega) \end{bmatrix} = \begin{bmatrix} G(\vec{r}_{b1}|\vec{r}_{s1};\omega) & G(\vec{r}_{b1}|\vec{r}_{s2};\omega) \\ G(\vec{r}_{b2}|\vec{r}_{s1};\omega) & G(\vec{r}_{b2}|\vec{r}_{s2};\omega) \\ G(\vec{r}_{b3}|\vec{r}_{s3};\omega) & G(\vec{r}_{b3}|\vec{r}_{s4};\omega) \\ G(\vec{r}_{b4}|\vec{r}_{s3};\omega) & G(\vec{r}_{b4}|\vec{r}_{s4};\omega) \end{bmatrix} \begin{bmatrix} q(\vec{r}_{s1};\omega) \\ q(\vec{r}_{s2};\omega) \end{bmatrix} \qquad \text{Equation (3)}$$

$$p_b = G_b q$$

$$\begin{bmatrix} p(\vec{r}_{d1};\omega) \\ p(\vec{r}_{d2};\omega) \end{bmatrix} = \begin{bmatrix} G(\vec{r}_{d1}|\vec{r}_{s1};\omega) & G(\vec{r}_{d1}|\vec{r}_{s2};\omega) \\ G(\vec{r}_{d2}|\vec{r}_{s1};\omega) & G(\vec{r}_{d2}|\vec{r}_{s2};\omega) \end{bmatrix} \begin{bmatrix} q(\vec{r}_{s1};\omega) \\ q(\vec{r}_{s2};\omega) \end{bmatrix} \qquad \text{Equation (4)}$$

$$p_d = G_d q$$

$$\begin{bmatrix} p(\vec{r}_{b1};\omega) \\ p(\vec{r}_{b2};\omega) \\ p(\vec{r}_{b3};\omega) \\ p(\vec{r}_{b4};\omega) \\ p(\vec{r}_{d1};\omega) \\ p(\vec{r}_{d2};\omega) \end{bmatrix} = \begin{bmatrix} G(\vec{r}_{b1}|\vec{r}_{s1};\omega) & G(\vec{r}_{b1}|\vec{r}_{s2};\omega) \\ G(\vec{r}_{b2}|\vec{r}_{s1};\omega) & G(\vec{r}_{b2}|\vec{r}_{s2};\omega) \\ G(\vec{r}_{b3}|\vec{r}_{s3};\omega) & G(\vec{r}_{b3}|\vec{r}_{s4};\omega) \\ G(\vec{r}_{b4}|\vec{r}_{s3};\omega) & G(\vec{r}_{b4}|\vec{r}_{s4};\omega) \\ G(\vec{r}_{d1}|\vec{r}_{s1};\omega) & G(\vec{r}_{d1}|\vec{r}_{s2};\omega) \\ G(\vec{r}_{d2}|\vec{r}_{s1};\omega) & G(\vec{r}_{d2}|\vec{r}_{s2};\omega) \end{bmatrix} \begin{bmatrix} q(\vec{r}_{s1};\omega) \\ q(\vec{r}_{s2};\omega) \end{bmatrix} \qquad \text{Equation (5)}$$

$$p_t = G_t q$$

In the next place, a variable representative of the space is defined as a spatially averaged acoustic energy in the embodiment of the present invention. The variable may be represented by the following Equation (6).

$$e = \frac{1}{2} p * p = q^H \left(\frac{1}{2} G^H G\right) q = q^H R q \qquad \text{Equation (6)}$$

The variable representative of the space is defined as the spatially averaged acoustic energy because it is difficult to express acoustic characteristics within a zone only by the sound pressure levels themselves of the respective points. In other words, in the embodiment of the present invention, it is considered that the spatially averaged acoustic potential energy of the bright zone (BZ), the spatially averaged acoustic energy of the dark zone (DZ), and the spatially averaged acoustic potential energy of the total sound zone (TZ) are sound pressure levels of each zone.

In Equation (6), the matrix R is defined as a correlation matrix which indicates how much interference each sound source causes in a defined zone. The figure of 2 means the number of the microphones 210 in Equation (2) (see FIG. 1). For convenience of understanding, the embodiment of the present invention takes a simple example. However, actually, the numeric means the number of the microphones included within a defined zone.

Namely, when 30 microphones are used as shown in FIG. 2c, the figure of 2 would be changed into 30. It is possible to represent the spatially averaged acoustic energy for the bright zone (BZ) and the dark zone (DZ), which is defined by this logic.

$$e_b = q^H R_b q \qquad \text{Equation (7)}$$

$$e_d = q^H R_d q \qquad \text{Equation (8)}$$

$$e_t = q^H R_t q \qquad \text{Equation (9)}$$

Next, provided is a description of each of processes of generating a first sound source signal and a second sound source signal which are required so as to obtain a required control effect by using the sound pressure level of each zone, which is defined in Equations (7) to (9).

1. Determination of the Sound Source Signal for Maximizing the Contrast Between the Sound Pressure Level and Total Magnitude of the Sound Input in the Bright Zone (BZ)

The total magnitude of the input is defined as a sum of the absolute value of complex magnitude of the first sound source signal and the absolute value of complex magnitude of the second sound source signal. This can be referred to as a total magnitude of control effort. The total magnitude of input is represented by the following Equation (10).

$$\text{total magnitude of input} = |G_0|^2 q^H q \qquad \text{Equation (10)}$$

Here, $|G_0|^2$ is the total magnitude of the input, that is to say, a normalizing constant which changes the control effort into the dimension of the spatially averaged acoustic energy.

The contrast between the sound pressure level and the total magnitude of the input in the bright zone (BZ) can be represented as the following Equation (11) by using the Equations (7) and (10). This is defined as "acoustic brightness".

$$\alpha = \frac{q^H R_a q}{|G_0|^2 q^H q} \qquad \text{Equation (11)}$$

Accordingly, the determination of the sound source signal for maximizing the contrast between the sound pressure level and the total magnitude of the input in the bright zone (BZ) corresponds to how to obtain the sound source signal for maximizing the value of a in the Equation (11).

The Equation (11) can be formalized as a mathematical problem of maximizing Reyleigh quotient $\alpha$. This is represented by the following Equation (12).

$$R_b q = \alpha |G_0|^2 q \qquad \text{Equation (12)}$$

As shown in the Equation (12), the obtaining of the sound source signal for maximizing the value of $\alpha$ is equal to the obtaining of a maximum eigenvalue of a generalized eigenvalue problem. Also, an eigenvector corresponding to the maximum eigenvalue becomes the first sound source signal and the second sound source signal.

2. Determination of the Input Signal for Maximizing the Contrast Between the Bright Zone (BZ) and the Dark Zone (DZ)

The input signal of the sound source for maximizing the contrast between the sound pressure level of the bright zone (BZ) and the sound pressure level of the dark zone (DZ) is considered. As with the case 1 (Determination of the sound source signal for maximizing the contrast between the sound pressure level of the bright zone (BZ) and total magnitude of the sound input), the sound pressure level of the bright zone (BZ) with respect to that of the dark zone (DZ) can be mathematically represented by the following Equation (13). This is defined as "acoustic contrast 1".

$$\beta = \frac{q^H R_b q}{q^H R_d q} \qquad \text{Equation (13)}$$

$$R_d^{-1} R_b q = \beta q \qquad \text{Equation (14)}$$

In the same manner as described above, the Equation (13) can be formalized as a problem of maximizing Reyleigh quotient $\beta$. As shown in the Equation (14), the obtaining of the sound source signal for maximizing the value of $\beta$ is equal to the obtaining of a maximum eigenvalue of a generalized eigenvalue problem. Also, an eigenvector corresponding to the maximum eigenvalue becomes the first sound source signal and the second sound source signal.

Therefore, while the conventional methods use the relation between a listener and the sound source in a limited form, the embodiment of the present invention uses a method for obtaining an optimized sound source control signal by analyzing all the transfer functions.

As a result, unlike an active noise control method which only decreases the sound pressure level, the embodiment of the present invention is able to increase a relative difference of the sound pressure level in accordance with the zone. In other words, it is possible to perform control to increase the acoustic contrast between two different zones as well as the magnitude of the sound pressure level corresponding to the acoustic brightness.

3. Determination of the Input Signal for Maximizing the Contrast Between the Sound Pressure Level of the Bright Zone (BZ) and the Sound Pressure Level of the Total Sound Zone (TZ)

The sound source input signal for maximizing the contrast between the sound pressure level of the bright zone (BZ) and the sound pressure level of the total sound zone (TZ) will be described. As with the case 2 (Determination of the input signal for maximizing the contrast between the bright zone (BZ) and the dark zone (DZ)), the sound pressure level of the total sound zone (TZ) with respect to that of the dark zone (DZ) can be mathematically represented by the following Equation (15). This is defined as "acoustic contrast 2".

$$\beta' = \frac{q^H R_b q}{q^H R_t q} \qquad \text{Equation (15)}$$

$$R_t^{-1} R_b q = \beta' q \qquad \text{Equation (16)}$$

In the same manner as described above, the Equation (15) can be formalized as a problem of maximizing Reyleigh quotient $\beta'$. As shown in the Equation (16), the obtaining of the sound source signal for maximizing the value of $\beta'$ is equal to the obtaining of a maximum eigenvalue of a generalized eigenvalue problem. Also, an eigenvector corresponding to the maximum eigenvalue becomes the first sound source signal and the second sound source signal.

4. Method for Providing an Independent Acoustic Environment to a Plurality of the Bright Zones (BZ)

Three kinds of methods for providing an independent acoustic environment to a plurality of the bright zones (BZ) will be described.

[Method 1] In the first bright zone (BZ1), a ratio between the spatially averaged acoustic energy by the first sound source signal and a sum of the energies of the first sound source signal is intended to be maximized. Additionally, in the second bright zone (BZ2), a ratio between the spatially averaged acoustic energy by the second sound source signal and a sum of the energies of the second sound source signal is intended to be maximized.

In this case, the input signal is generated differently for each bright zone. This is represented as follows.

$$\alpha_{(1)} = \frac{q_{(1)}^H R_{b(1)} q_{(1)}}{q_{(1)}^H q_{(1)}} \qquad \text{Equation (17)}$$

$$\alpha_{(2)} = \frac{q_{(2)}^H R_{b(2)} q_{(2)}}{q_{(2)}^H q_{(2)}} \qquad \text{Equation (18)}$$

[Method 2] In the first bright zone (BZ1), a ratio between the spatially averaged acoustic energy by the first sound source signal and the spatially averaged acoustic energy of remaining zone other than the first bright zone (BZ1) is intended to be maximized. Simultaneously, in the second bright zone (BZ2), a ratio between the spatially averaged acoustic energy by the second sound source signal and the spatially averaged acoustic energy of remaining zone other than the second bright zone (BZ2) is intended to be maximized.

In this case, the input signal is generated differently for each bright zone (BZ). This is represented as follows.

$$\beta_{(1)} = \frac{q_{(1)}^H R_{b(1)} q_{(1)}}{q_{(1)}^H R_{d(1)} q_{(1)}} \quad \text{Equation (19)}$$

$$\beta_{(2)} = \frac{q_{(2)}^H R_{b(2)} q_{(2)}}{q_{(2)}^H R_{d(2)} q_{(2)}} \quad \text{Equation (20)}$$

[Method 3] When a plurality of the bright zones (BZ) are provided, a ratio between the spatially averaged acoustic energy by the first sound source signal and the spatially averaged acoustic energy of the total zone including the first bright zone (BZ1) is intended to be maximized in the first bright zone (BZ1). Simultaneously, a ratio between the spatially averaged acoustic energy by the second sound source signal and the spatially averaged acoustic energy of the total zone including the second bright zone (BZ2) is intended to be maximized in the second bright zone (BZ2).

In this case, the input signal is generated differently for each bright zone (BZ). This is represented as follows.

$$\beta'_{(1)} = \frac{q_{(1)}^H R_{b(1)} q_{(1)}}{q_{(1)}^H R_t q_{(1)}} \quad \text{Equation (21)}$$

$$\beta'_{(2)} = \frac{q_{(2)}^H R_{b(2)} q_{(2)}}{q_{(2)}^H R_t q_{(2)}} \quad \text{Equation (22)}$$

In the above-described methods, the input signal is generated differently for each bright zone (BZ). The signal input to the first sound source and the second sound source is commonly expressed by the following Equation (23).

$$\begin{bmatrix} q(\vec{r}_{s1};\omega) \\ q(\vec{r}_{s2};\omega) \end{bmatrix} = x_1(\omega) \begin{bmatrix} q_{(1)}(\vec{r}_{s1};\omega) \\ q_{(1)}(\vec{r}_{s2};\omega) \end{bmatrix} + x_2(\omega) \begin{bmatrix} q_{(2)}(\vec{r}_{s1};\omega) \\ q_{(2)}(\vec{r}_{s2};\omega) \end{bmatrix} \quad \text{Equation (23)}$$

$$q = q_{(1)} x_1(\omega) + q_{(2)} x_2(\omega)$$

In this case, it is possible to create a plurality of independent acoustic environments in which a reproduced sound by the first input signal exists in the first bright zone (BZ1) and a reproduced sound by the second input signal exists in the second bright zone (BZ2).

In summary of the theoretical foregoing, while the conventional methods use the relation between a listener and the sound source in a limited form, the embodiment of the present invention uses a method for obtaining an optimized sound source signal by analyzing all the transfer functions.

As a result, unlike an active noise control method which only decreases the sound pressure level, the embodiment of the present invention increases a relative difference of the sound pressure level in accordance with the zone in the acoustic space. In other words, the embodiment of the present invention performs control to increase the acoustic contrast between two different zones as well as the magnitude of the sound pressure level corresponding to the acoustic brightness.

The method for forming the bright zone (BZ) and the dark zone (DZ) will be described in more detail with greater reference to FIG. 3.

As shown in FIG. 1, the configuration which measures the transfer function and sets the focusing zone includes a sound source 100, a sensor 200, a signal generator 300, and a signal analyzer 400.

The sound source 100 includes a plurality of the speakers 110 corresponding to a plurality of the sound sources and a multi-channel audio amplifier 120 which drives the plurality of speakers. The sensor 200 includes a plurality of the microphones 210 installed in the bright zone (BZ) and the dark zone (DZ). The signal generator 300 includes a multi-channel signal generator 310 which gives a synchronized individual sound source signal to each speaker through the multi-channel audio amplifier of the sound source. The signal analyzer 400 includes a multi-channel signal analyzer 410 which measures a transfer function between a sound source signal q input to the sound source 100 and a sound signal p sensed by the sensor 200, determines an appropriate sound source signal, and then transmits the information on the determined sound source signal to the multi-channel signal generator 310 of the signal generator 300.

Here, the appropriate sound source signal maximizes the acoustic brightness $\alpha_{(1)}, \alpha_{(2)}$ of Equations 17 and 18 (acoustic brightness control), maximizes the acoustic contrast 1 $\beta_{(1)}, \beta_{(2)}$ of Equations 19 and 20 (acoustic contrast 1 control) or maximizes the acoustic contrast 2 $\beta_{(1)}, \beta_{(2)}$ of Equations 21 and 22 (acoustic contrast 2 control). Also, the thus determined sound source signal corresponds to a control sound source signal which is a term used in the claims of the present invention.

Figure 3:
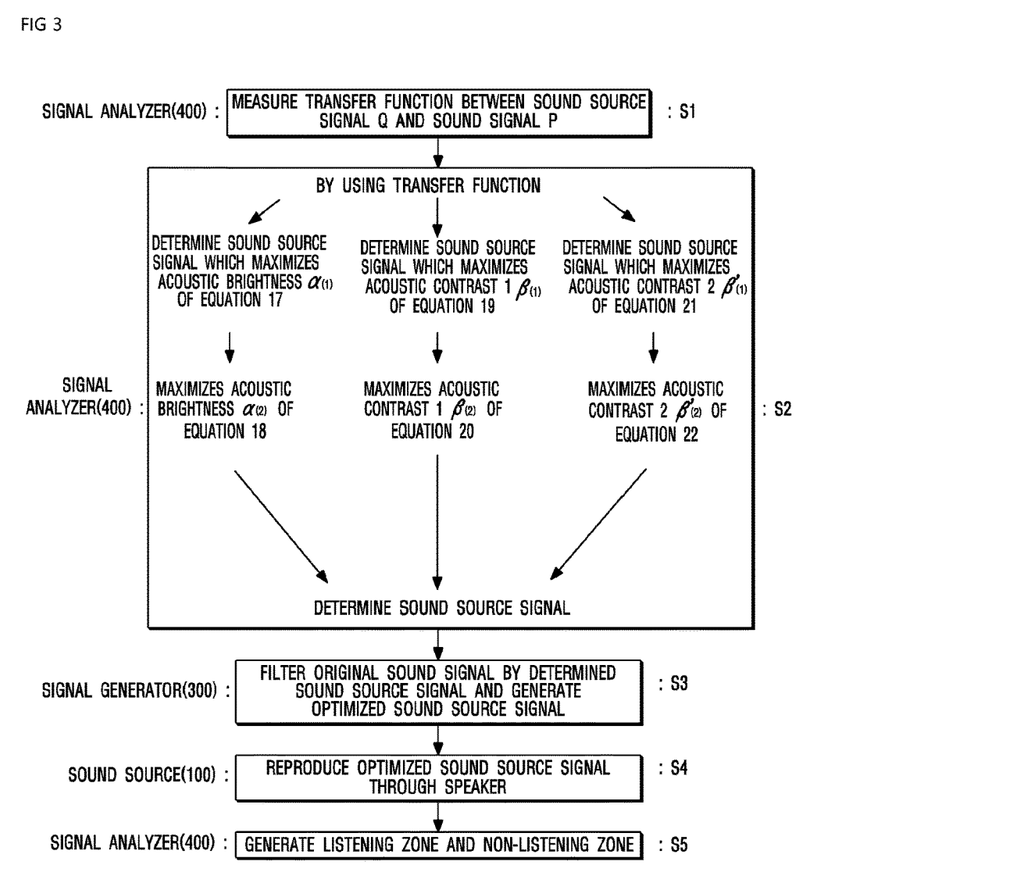
FIG. 3 is a flowchart showing a method for setting a bright zone (BZ) and a dark zone (DZ) in the embodiment of the present invention.

Referring to FIG. 3, the signal analyzer 400 measures the transfer function between the sound source signal of the sound source 100 and the sound signal of the sensor 200 (Step S1). In the measurement of the transfer function, a large amount of measurement are required according to the number of the speakers and the number of the microphones. Therefore, the transfer function can be easily measured by the following simple method which is used generally.

The simple method is to input, as a sound source signal, white noise with no correlation to the plurality of speakers and is to separate the contribution of each sound source from the sound signal sensed by each microphone, so that the transfer function between the sound source signal of the sound source and the sound signal of the sensor is measured by only one measurement.

Next, the signal analyzer 400 determines an appropriate sound source signal by using the transfer function measured in step S1 and transmits the information on the determined sound source signal to the signal generator 300 (Step S2).

Here, the appropriate sound source signal maximizes the acoustic brightness $\alpha_{(1)}, \alpha_{(2)}$ of Equations 17 and 18 (acoustic brightness control), maximizes the acoustic contrast 1 $\beta_{(1)}, \beta_{(2)}$ of Equations 19 and 20 (acoustic contrast 1 control) or maximizes the acoustic contrast 2 $\beta_{(1)}, \beta_{(2)}$ of Equations 21 and 22 (acoustic contrast 2 control). Also, the thus determined sound source signal corresponds to a control sound source signal which is a term used in the claims of the present invention.

Here, a single frequency has been described. Furthermore, in the case of a plurality of frequencies, it can be understood that the sound source signal for each frequency is determined. Also, the sound source signal determined herein functions as a filter coefficient which filters an original sound signal (any sound intended to be heard in the bright zone (BZ)) in a below-described step 3.

Next, the signal generator 300 filters the original sound signal by the sound source signal determined in step 2 on the basis of the information transmitted from the signal analyzer 400, generates a sound source signal (filtered sound source signal) optimized for the bright zone (BZ), that is, generates a control sound source signal, and then transmits to the sound source 100 (Step S3).

Here, a single frequency has been described. Furthermore, in the case of a plurality of frequencies, it can be understood that, for each frequency, the original sound signal is filtered by the determined sound source signal and a sound source signal optimized for the bright zone (BZ), that is, a control sound source signal is generated.

Next, the sound source 100 outputs the sound source signal optimized by the signal generator 300 through the amplifier and speakers (Step S4). Accordingly, the bright zone (BZ) and the dark zone (DZ) may be generated in the acoustic space (Step S5).

The acoustic brightness control allows the bright zone (BZ) to obtain the maximum sound pressure level with respect to the same input magnitude. Therefore, when the input magnitude cannot be increased or when the input magnitude is limited, the acoustic brightness control is more useful.

However, the acoustic brightness control has a disadvantage in that the volume of the sound is relatively greater than those of the acoustic contrast 1 control and the acoustic contrast 2 control in a zone other than the bright zone (BZ). Therefore, when the volume of the sound doesn't have to be very small in a zone other than the bright zone (BZ), the acoustic brightness control is more efficient and effective.

As long as the input magnitude is not extremely limited, the acoustic contrast 1 control and the acoustic contrast 2 control shows a bright zone (BZ) production result more excellent than that of the acoustic brightness control. Also, for all small, medium, and large sound reproducing apparatuses, the acoustic contrast 1 control and the acoustic contrast 2 control are more excellent than the acoustic brightness control because the volume of the sound becomes very small in a zone other than the bright zone (BZ).

Hereinafter, on the basis of the above-described generation principle of the bright zone (BZ), an acoustic spatial adjustment system capable of control the focusing of the sound will be described.

Figure 4:
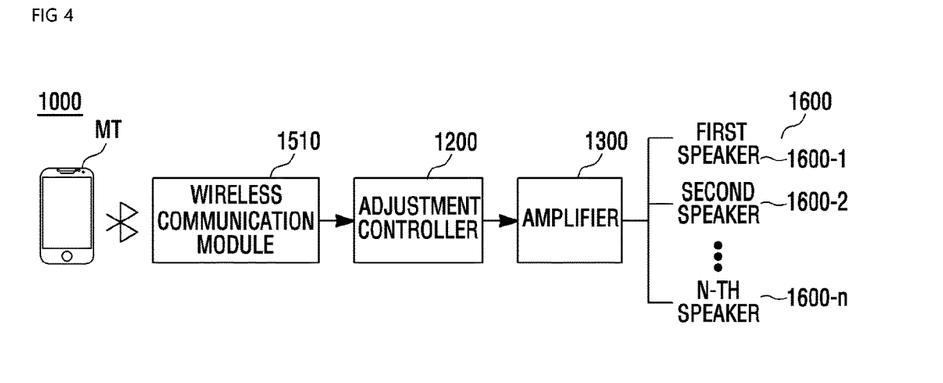
FIG. 4 is a block diagram showing a configuration of an acoustic spatial adjustment system according to the embodiment of the present invention.

FIG. 4 is a block diagram showing a configuration of an acoustic spatial adjustment system 1000 according to the embodiment of the present invention. The acoustic spatial adjustment system 1000 shown in FIG. 4 has a configuration advantageous for focusing the other calling party's voice on a driver's position in making a call using wireless communication while driving. Here, the wireless communication may include Bluetooth or Near Field Communication (NFC). Referring to FIG. 2a, the driver seat (Front Left) may be set to the bright zone (BZ) and the other seats (Front Right, Rear Left, and Rear Right) are may be set to the dark zone (DZ).

The bright zone (BZ) and the dark zone (DZ) can be set by the above-described method. The filter coefficient for changing the location setting of the bright zone (BZ) can be calculated by the above-described method and stored.

As shown in FIG. 4, the acoustic spatial adjustment system 1000 includes a wireless communication module 1510, an adjustment controller 1200, an amplifier 1300, and a plurality of speakers 1600.

The wireless communication module 1510 is connected to an external mobile terminal (MT) by wireless communication and receives a voice signal (i.e., the other calling party's voice) from the mobile terminal (MT). Here, when Bluetooth is used, the wireless communication module 1510 is paired with the mobile terminal (MT) by Bluetooth and receives the voice signal. Not only Bluetooth but also various wireless communication methods such as Near Field Communication (NFC) may be used. The voice signal may have a frequency range of from 300 Hz to 4,000 Hz. However, there is no limitation to this.

The wireless communication module 1510 transmits the received voice signal to the adjustment controller 1200. The adjustment controller 1200 generates a sound source signal for focusing the output of the transmitted voice signal on the bright zone (BZ). The sound source signal is a signal to be output from the speakers 1600. The sound source signal is generated by filtering the voice signal by using a predetermined filter coefficient.

The filter coefficient maximizes a ratio between the spatially averaged acoustic energy of the bright zone (BZ) (e.g., driver seat) and the spatially averaged acoustic energy of the dark zone (DZ) (e.g., other seats other than the driver seat), that is, a zone other than the bright zone (BZ).

The sound source signal generated by the adjustment controller 1200 is divided into multi-channels and amplified by the amplifier 1300, and then is output through the speakers 1600. The sound output from the speakers 1600 by the sound source signal is to be focused only on the set bright zone (BZ).

Although the foregoing description assumes that the bright zone (BZ) is a zone where the driver seat is located, the location of the bright zone (BZ) may be set differently according to a user's input, etc. Specifically, a user is able to set the location of the bright zone (BZ) or to change the location setting of the bright zone (BZ) by a means such as a touch screen (not shown), a jog-shuttle (not shown), a switch (not shown), a button (not shown), etc. Here, the filter coefficient corresponding to the location of the bright zone (BZ) is stored in advance, and may be referenced when the adjustment controller 1200 generates the sound source signal.

For example, when an image shown in FIG. 2b is displayed on a touch screen and the user sets the driver seat (Front Left) to the bright zone (BZ) by touching the position of the driver seat, the adjustment controller 1200 filters the voice signal by the filter coefficient for setting the driver seat (Front Left) to the bright zone (BZ) and then generates the sound source signal. Also, when the user sets a passenger seat (Front Right) to the bright zone (BZ) by touching the position of the passenger seat, the adjustment controller 1200 filters the voice signal by the filter coefficient for setting the passenger seat (Front Right) to the bright zone (BZ) and then generates the sound source signal. The filter coefficient for setting the driver seat (Front Left) to the bright zone (BZ) and the filter coefficient for setting the passenger seat (Front Right) to the bright zone (BZ) may be calculated in advance by the configuration and method shown in FIGS. 1 and 3.

In other words, each of the filter coefficients for setting the seats (Front Left, Front Right, Rear Left, and Rear Right) in the vehicle to the bright zone (BZ) may be stored in advance in a storage (not shown). The adjustment controller 1200 reads the filter coefficient stored in advance in the storage (not shown) on the basis of the user's input, filters the voice signal, and generates and transmits the sound source signal, so that the sound source signal is output by the amplifier 1300 and the speakers 1600. Further, the sound which is output by the sound source signal is to be focused on the bright zone (BZ) set by the user.

Figure 5:
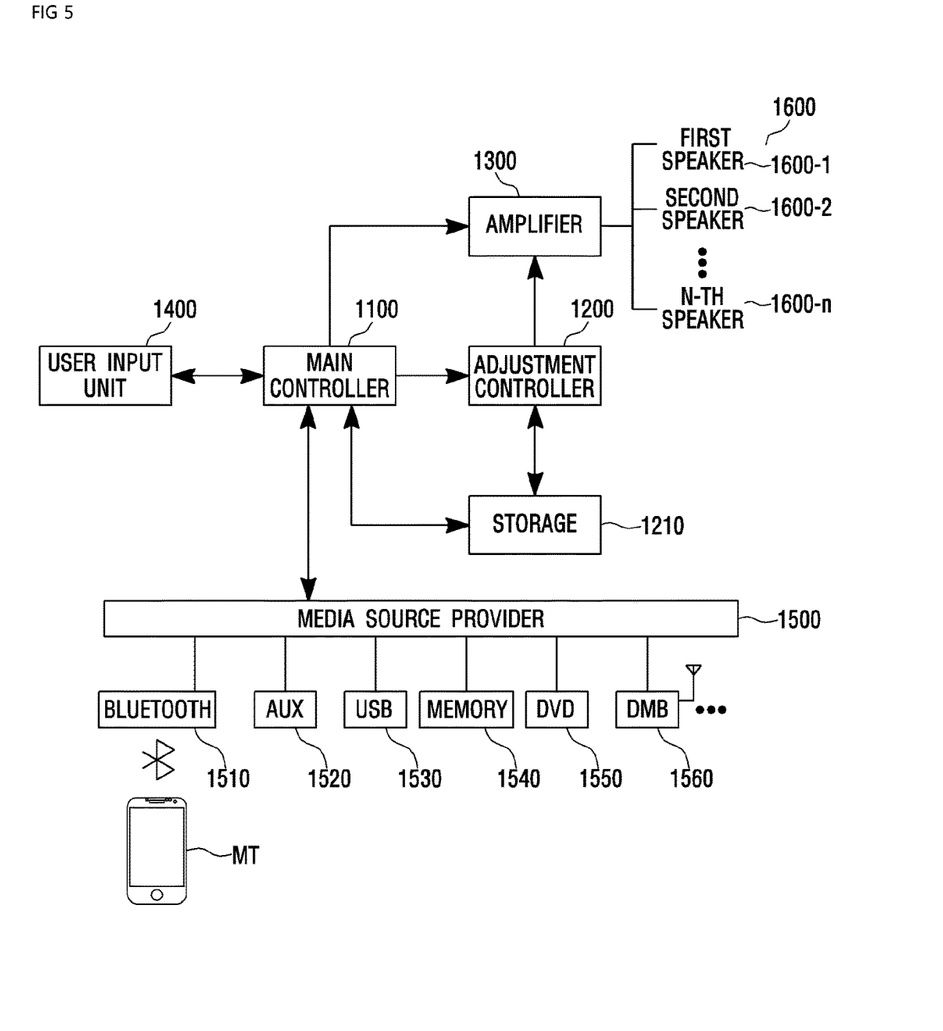
FIG. 5 is a block diagram showing a configuration of an acoustic spatial adjustment system according to another embodiment of the present invention.

FIG. 5 is a block diagram showing a configuration of the acoustic spatial adjustment system 1000 according to another embodiment of the present invention. The acoustic spatial adjustment system 1000 may include a main controller 1100, the adjustment controller 1200, a storage 1210, the amplifier 1300, a user input unit 1400, a media source provider 1500, and the speakers 1600.

The media source provider 1500 is connected to internal and external devices through a wireless communication module 1510, an AUX module 1520, a USB module 1530, a memory 1540, a DVD module 1550, a DMB module 1560, etc., and provides various audio signals. A method for connecting the internal and external devices and each module in a wired or wireless manner may include a variety of conventional methods. Detailed descriptions thereof will be omitted.

The user input unit 1400 receives a user's input for the audio signal provided from the media source provider 1500. The user input unit 1400 may be implemented by a device such as a touch screen (not shown), a jog-shuttle (not shown), a switch (not shown), a button (not shown), etc. The user may select the audio signal that the user wants to listen to in the vehicle by using the user input unit 1400. Also, the user input unit 1400 receives the user's input for location selection of the bright zone (BZ) on which the output of the audio signal is focused.

For example, when the image shown in FIG. 2b is displayed on the touch screen, the user may select a location to be set to the bright zone (BZ) while viewing the corresponding image. The user's input related to the location setting of the bright zone (BZ) is used to generate the sound source signal by the adjustment controller 1200. Specifically, the user's input determines the filter coefficient supposed to filter the audio signal.

The main controller 1100 may control the audio signal provided from the media source provider 1500 to be output. The main controller 1100 controls the amplifier 1300 and the plurality of speakers 1600, and causes the audio signal provided from the media source provider 1500 to be amplified and output.

If there is the user's input related to the location setting of the bright zone (BZ), the main controller 1100 transmits the user's input to the adjustment controller 1200. The adjustment controller 1200 filters the audio signal provided from the media source provider 1500 on the basis of the user's input and generates the sound source signal. Here, the adjustment controller 1200 filters the audio signal by using the filter coefficient which maximizes a ratio between the spatially averaged acoustic energy of the bright zone (BZ) and the spatially averaged acoustic energy of a zone other than the first bright zone (BZ1).

The bright zone (BZ) may be set in advance or may be set on the basis of the user's input received by the user input unit 1400. For example, through the user input unit 1400 such as a jog-shuttle (not shown), a switch (not shown), etc., the user may select a zone to be set to the bright zone (BZ). The bright zone (BZ) may be one or more seats. Also, for the purpose of providing an interface for convenience of operation, a zone to be set to the bright zone (BZ) can be visually displayed on the display in the vehicle in response to the user's input by the jog-shuttle (not shown) or switch (not shown).

The filter coefficient for setting the respective seats (Front Left, Front Right, Rear Left, and Rear Right) to the bright zone (BZ) may be calculated in advance by the method described with reference to FIGS. 1 and 3 and may be stored in the storage 1210 in various ways (e.g., a table).

The adjustment controller 1200 reads the filter coefficient stored in the storage (not shown) on the basis of the user's input for setting the bright zone (BZ) and filters the voice signal by the corresponding filter coefficient, thereby controlling the sound which is output from the speakers 1600 to be focused only on the bright zone (BZ) set by the user.

The sound source signal received from adjustment controller 1200 is divided into multi-channels and amplified by the amplifier 1300. The signal is transmitted to the speakers 1600 and is output in in such a manner as to be focused on the bright zone (BZ).

According to the acoustic spatial adjustment system 1000 based on the above-described configuration, the sound can be focused on a specific zone in the vehicle by using existing mounted speakers in the vehicle or by installing only additional speakers for performance improvement. Also, the individually distinguished sound (audio signal of a stereo system, CD, DVD, etc., a telephone voice signal connected by Bluetooth, etc.) can be adjusted to be heard only in a specific zone (bright zone) and can be adjusted to be heard very small or not to be heard in a zone (dark zone) other than the specific zone. Also, the user is able to select or adjust the sound focusing in the vehicle.

While the present invention has been described from the viewpoint of the specific embodiment including the exemplary embodiment of the present invention, it can be understood by those skilled in the art that various substitutions and modifications can be made in the above-described configuration of the present invention. Also, structural and functional changes can be variously made without departing from the scope and spirit of the present invention. Therefore, the scope and spirit of the present invention should be construed broadly as described in the claims of the present specification.

INDUSTRIAL APPLICABILITY

According to the embodiment of the present invention, the acoustic spatial adjustment system according to the above-described configuration can focus the sound in the vehicle on a specific zone by using existing mounted speakers or by installing only additional speakers for performance improvement. Also, the acoustic spatial adjustment system can control such that the individually separated sound (audio signal of a stereo system, CD, DVD, etc., a telephone voice signal connected by Bluetooth, etc.) is adjusted to be heard only in a specific zone (bright zone) and to be heard very small or not to be heard in a zone (dark zone) other than the specific zone. Also, the acoustic spatial adjustment system can allow a user to select or control the focusing of the sound in the vehicle.

The invention claimed is:

1. An acoustic spatial adjustment system comprising:
   a wireless communication module which receives a voice signal from a mobile terminal connected thereto by wireless communication;
   an adjustment controller which filters the voice signal in order to generate a sound source signal for focusing an output of the voice signal transmitted from the wireless communication module on a bright zone (BZ);
   an amplifier which divides the sound source signal transmitted from the adjustment controller into multi-channels and amplifies; and
   a plurality of speakers which output the sound source signal transmitted from the amplifier,
   wherein the adjustment controller filters the voice signal by using a filter coefficient which maximizes a ratio between a spatially averaged acoustic energy of the bright zone (BZ) and a spatially averaged acoustic energy of a zone other than the bright zone (BZ).

2. The acoustic spatial adjustment system of claim 1, wherein the wireless communication is Bluetooth or Near Field Communication (NFC).

3. The acoustic spatial adjustment system of claim 1, wherein the voice signal has a frequency range of from 300 Hz to 4,000 Hz.

4. An acoustic spatial adjustment system comprising:
a media source provider which provides an audio signal;
a user input unit which receives a user's input for location selection of a bright zone (BZ) on which an output of the audio signal provided from the media source provider is focused;
a main controller which controls the output of the audio signal on the basis of at least one of the audio signal provided from the media source provider and the user's input transmitted from the user input unit;
an adjustment controller which filters the audio signal in order to generate a sound source signal for focusing the audio signal on the bright zone (BZ) corresponding to the user's input;
an amplifier which divides the audio signal received from the main controller or the sound source signal received from the adjustment controller into multi-channels and amplifies; and
a plurality of speakers which output the sound source signal transmitted from the amplifier,
wherein the adjustment controller filters the audio signal by using a filter coefficient which maximizes a ratio between a spatially averaged acoustic energy of the bright zone (BZ) and a spatially averaged acoustic energy of a zone other than the bright zone (BZ).

5. The acoustic spatial adjustment system of claim 4, further comprising a storage which stores a filter coefficient corresponding to a plurality of the bright zones, wherein the adjustment controller reads the filter coefficient corresponding to the bright zone selected by the user from the storage and filters the audio signal.

6. The acoustic spatial adjustment system of claim 4, wherein the user input unit comprises a touch screen, a jog-shuttle, a switch, or a button.

7. The acoustic spatial adjustment system of claim 4, wherein the media source provider comprises at least one of a wireless communication module, an AUX module, a USB module, a memory module, a DVD module, and a DMB module.

* * * * *

UNITED STATES PATENT AND TRADEMARK OFFICE
CERTIFICATE OF CORRECTION

Page 1 of 1

PATENT NO. : 10,506,360 B2
APPLICATION NO. : 16/097302
DATED : December 10, 2019
INVENTOR(S) : Yang-Hann Kim et al.

It is certified that error appears in the above-identified patent and that said Letters Patent is hereby corrected as shown below:

On the Title Page

Under item (12), "Kim" should read -- Kim et al. --

Under item (72), the "Inventors" section, and beneath "KIM, Yang-Hann, Daejeon (KR)", add the following inventors:
-- "LEE, Jong-Hwa, Yuseong-gu, Daejeon (KR);
PARK, Joon-Young, Songpa-gu, Seoul (KR);
KIM, Wan-Jung, Yuseong-gu, Daejeon (KR);
KIM, Hwan, Yongsan-gu, Seoul (KR)" --

Signed and Sealed this
Twenty-ninth Day of March, 2022

Drew Hirshfeld
*Performing the Functions and Duties of the
Under Secretary of Commerce for Intellectual Property and
Director of the United States Patent and Trademark Office*